US012276400B1

(12) United States Patent
Nichols et al.

(10) Patent No.: US 12,276,400 B1
(45) Date of Patent: Apr. 15, 2025

(54) GOBO APPARATUS USING A COLLIMATED LIGHT SOURCE

(71) Applicant: Avid Labs, LLC, Fort Wayne, IN (US)

(72) Inventors: Joel A. Nichols, Columbia City, IN (US); Benjamin Powers, Fort Wayne, IN (US); Samuel Morrison, Fort Wayne, IN (US)

( * ) Notice: Subject to any disclaimer, the term of this patent is extended or adjusted under 35 U.S.C. 154(b) by 0 days.

(21) Appl. No.: 18/493,251

(22) Filed: Oct. 24, 2023

(51) Int. Cl.

| | |
|---|---|
| ***F21V 9/00*** | (2018.01) |
| ***F21V 11/00*** | (2015.01) |
| ***F21V 17/00*** | (2006.01) |
| *F21W 131/406* | (2006.01) |

(52) U.S. Cl.
CPC ............ *F21V 11/00* (2013.01); *F21V 17/002* (2013.01); *F21W 2131/406* (2013.01)

(58) Field of Classification Search
CPC .... F21V 9/00–35; F21V 11/00; F21V 17/002; F21W 2131/406
See application file for complete search history.

(56) References Cited

U.S. PATENT DOCUMENTS 4,602,321 A * 7/1986 Bornhorst ............... F21V 14/08 362/268
10,480,732 B2 11/2019 Nichols et al.

* cited by examiner

*Primary Examiner* — Sean P Gramling

(57) ABSTRACT

A gobo apparatus including a housing and a collimated light source disposed within the housing. The collimated light source is configured to emit collimated light. The collimated light source defines a light source axis and a light source plane. The gobo apparatus further includes at least one gobo connected to the housing. The at least one gobo is oriented non-perpendicularly to the light source plane.

18 Claims, 8 Drawing Sheets

GOBO APPARATUS USING A COLLIMATED LIGHT SOURCE

FIELD OF INVENTION

This disclosure relates generally to aesthetic lighting equipment. More specifically, it relates to lighting equipment with gobos.

BACKGROUND

A gobo is an object placed inside or in front of a light source to control the shape of the emitted light and its shadow. For studio photography purposes, the term "gobo" has come to refer to any device that casts a shadow, and various pieces of equipment that go in front of a light (such as a gobo arm or gobo body). In theatrical lighting, however, the term more specifically refers to a device placed in 'the gate' or at the 'point of focus' between the light source, called a lamp, and the lenses (or other optics). This placement is important because it allows a pattern with crisp, sharp edges to be projected onto a surface on the stage.

One common issue with using gobos is blurry or unfocused patterns. For example, gobos placed after the optics do not have the option of such fine focus and are more precisely called "flags" or "cookies". In general, refocusing the pattern projected by a gobo can be an arduous or outright impossible task given the constraints of the installation location, the position of the gobo relative to the light source, and/or projection of the light pattern onto a non-planar or angled surface. Hence, it is generally not possible to reposition or repurpose a particular lighting device with a gobo without dedicating a significant amount of time in recalibrating the light source, lenses, and/or gobo to achieve a desired and in focus pattern.

What is needed is improved lighting equipment including a gobo which is easier to install and calibrate.

SUMMARY

According to one embodiment, a gobo apparatus includes a housing and a collimated light source disposed within the housing. The collimated light source is configured to emit collimated light. The collimated light source defines a light source axis and a light source plane. The gobo apparatus further includes at least one gobo connected to the housing. The at least one gobo is oriented non-perpendicularly to the light source plane.

According to another embodiment, a gobo apparatus includes a housing having mounting features and a collimated light source disposed within the housing. The collimated light source is configured to emit collimated light. The collimated light source defines a light source axis and a light source plane. The gobo apparatus further includes an optical device removably connected to the housing by the mounting features. The gobo apparatus further includes a first head and a second head. Each head includes at least one gobo that is oriented non-perpendicularly to the light source plane. The at least one gobo is configured to project a focused pattern when the collimated light passes therethrough. Each head is configured to be removably connected to the housing by the mounting features such that the first and second heads are interchangeable with one another.

According to yet another embodiment, a method includes an initial step of providing a gobo apparatus. The gobo apparatus includes a housing, a collimated light source disposed within the housing and configured to emit collimated light. The collimated light source defines a light source axis and a light source plane. The gobo apparatus further includes a first head and a second head. Each head includes at least one gobo that is oriented non-perpendicularly to the light source plane. The at least one gobo is configured to project a focused pattern when the collimated light passes therethrough. Each head is configured to be removably connected to the housing by the mounting features such that the first and second heads are interchangeable with one another. The method includes a further step of connecting the first head onto the housing. The method includes a further step of removing the first head from the housing. The method further includes a step of connecting the second head onto the housing, wherein the focused pattern of the at least one gobo of the second head is automatically in focus.

DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplification are not to be construed as limiting the scope of the invention in any manner.

DETAILED DESCRIPTION

Figure 1:
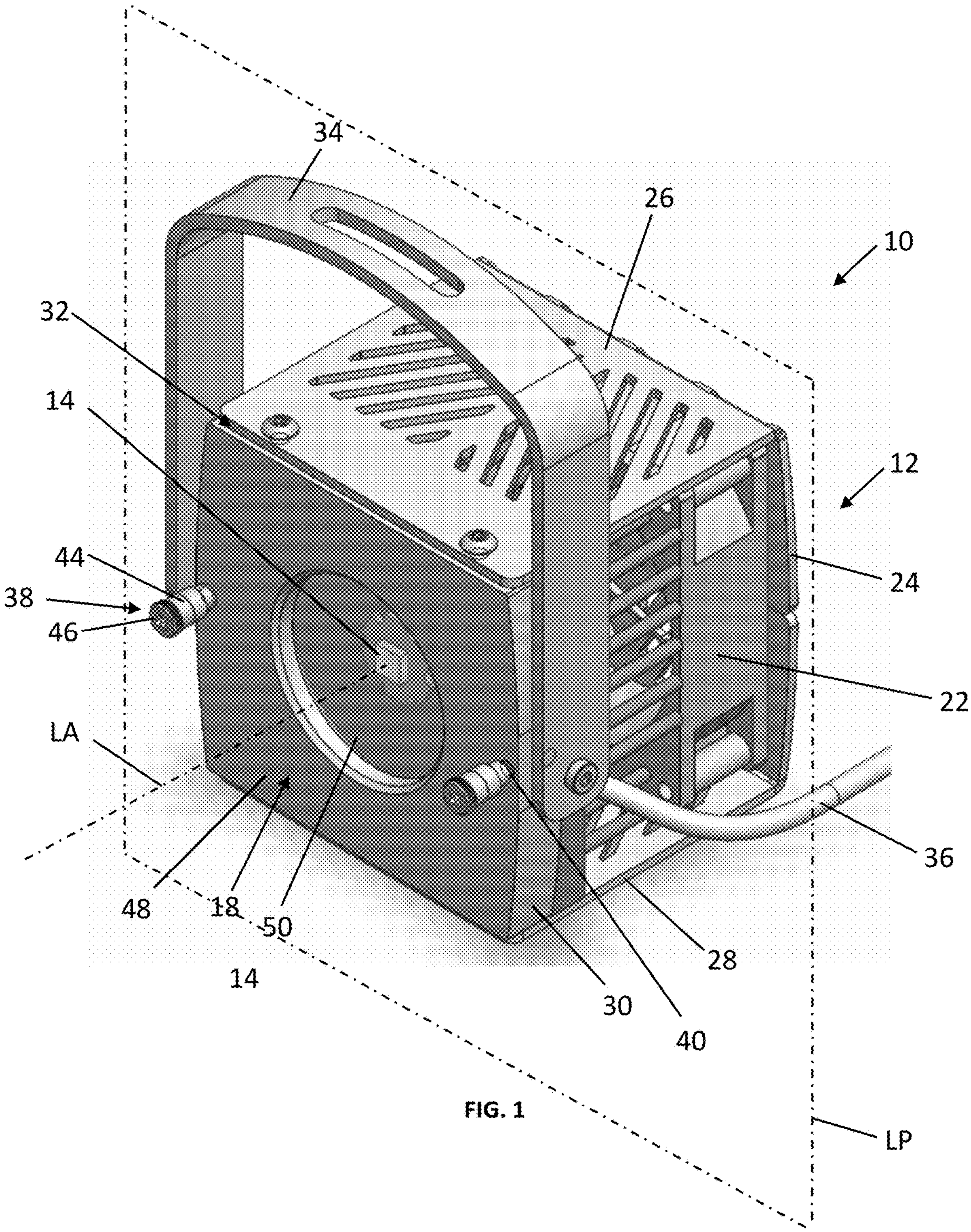
FIG. 1 is a front perspective view of an embodiment of a gobo apparatus which has a housing and an optical device.

The following detailed description and appended drawing describe and illustrate various exemplary embodiments of the invention. The description and drawings serve to enable one skilled in the art to make and use the invention, and are not intended to limit the scope of the invention in any manner. In respect of any methods disclosed and illustrated, the steps presented are exemplary in nature, and thus, the order of the steps is not necessary or critical.

As used herein, the term visible light refers to the spectrum of light which the human eye can see without the aid of some device. The term collimated light or collimated beam of light refers to parallel rays of visible light which minimally spreads as it propagates from the light source. The term focused pattern refers to a single shape or design or a grouping of shapes or designs that are projected using one or more gobos. As used herein, the phrase "in focus" means the pattern is illuminated as desired without significant blurriness.

Referring now to the drawings, and more particularly to FIGS. 1-5, 7, and 9, a gobo apparatus 10 is shown. The gobo apparatus 10 generally includes a housing 12, a collimated light source 14 disposed within the housing 12, and at least one gobo 16 removably attached to the housing 12. The gobo apparatus 10 projects a focused pattern, via the at least one gobo 16, onto a desired surface.

Achieving a desired pattern that is in focus is quite a challenge in prior art lighting equipment. Such prior art lighting equipment must generally be positioned at a particular location and distance from a desired surface to achieve a focused pattern. Additionally, prior art gobos must generally be positioned at a precise axial distance from the light source, be coaxial to the light source, and must be perpendicular to the light source to a achieve a focused pattern. If any one of those variables are slightly off, the pattern will be warped and/or out of focus.

In contrast to prior art lighting equipment, the gobo apparatus 10 can easily project a focused pattern with minimal to no adjustments by the user. Due to the collimated light passing through the gobo 16, the pattern remains in focus irrespective of an axial distance D between the collimated light source 14 and the gobo 16 (FIG. 5), a position GD of a gobo axis GA of the gobo 16 relative to a light source axis LA of the light source 14 (FIG. 4), and an orientation, i.e., angle, of the gobo 16 relative to a light source plane LP. The axial distance D between the gobo 16 and the light source may be approximately ⅛-12 inches (1.5-305 mm). The gobo axis GA of a given gobo 16 may be coaxial with the light source axis LA or separated by a distance GD which does not exceed the bounds of the housing 12. The orientation of the gobo may comprise any angle or curvature which is non-parallel to the light source plane LP, such as for example approximately 45 degrees, plus or minus 20 degrees.

In one embodiment, the gobo apparatus 10 may not include an optical device and/or a head for mounting the gobo(s) 16. Due to the collimated light, there is no need for a lensing system and/or a corresponding head, which is located at an optical center and at a particular focal point, in order to focus the light to obtain a focused pattern from the gobo 16.

In another embodiment, the gobo apparatus 10 further includes an interchangeable optical device 18 and an interchangeable head 20 upon which the at least one gobo 16 is secured. The interchangeable optical device 18 and head 20 allow the user to easily and efficiently switch patterns without need to change or adjust the housing, the light source, a position and/or orientation of the optical device 18 and/or the interchangeable head 20.

Figure 2:
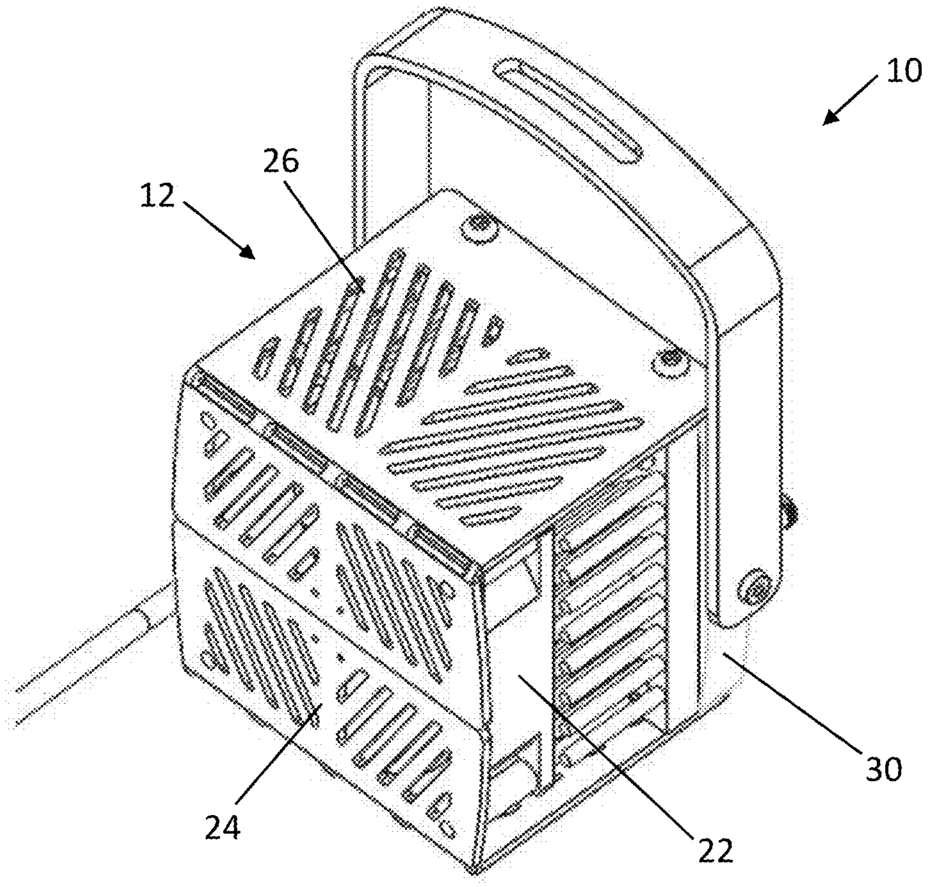
FIG. 2 is a rear perspective view of the gobo apparatus of FIG. 1.

The housing 12 houses the light source 14 and mounts the gobo 16. The housing 12 includes an internal frame 22, a back wall 24 composed of one or more panels, top and bottom walls 26, 28, side walls 30, and an open front end 32 opposite the back wall for accommodating the head 20 (FIGS. 1-2). The side walls 30 may or may not be open side walls to allow access to the internal frame 22 and provide additional ventilation. A handle 34 can be pivotally connected to both side walls 30 by fasteners, such as screws (unnumbered). A power cable 36 for powering the light source 14 can be attached to the internal frame 22 and extend out of the housing 12 at one of its sides. The housing 12 may or may not include a fan for cooling the light source 14 (not shown). The housing 12 may be composed of any suitable material, such as plastic and/or metal.

Figure 3:
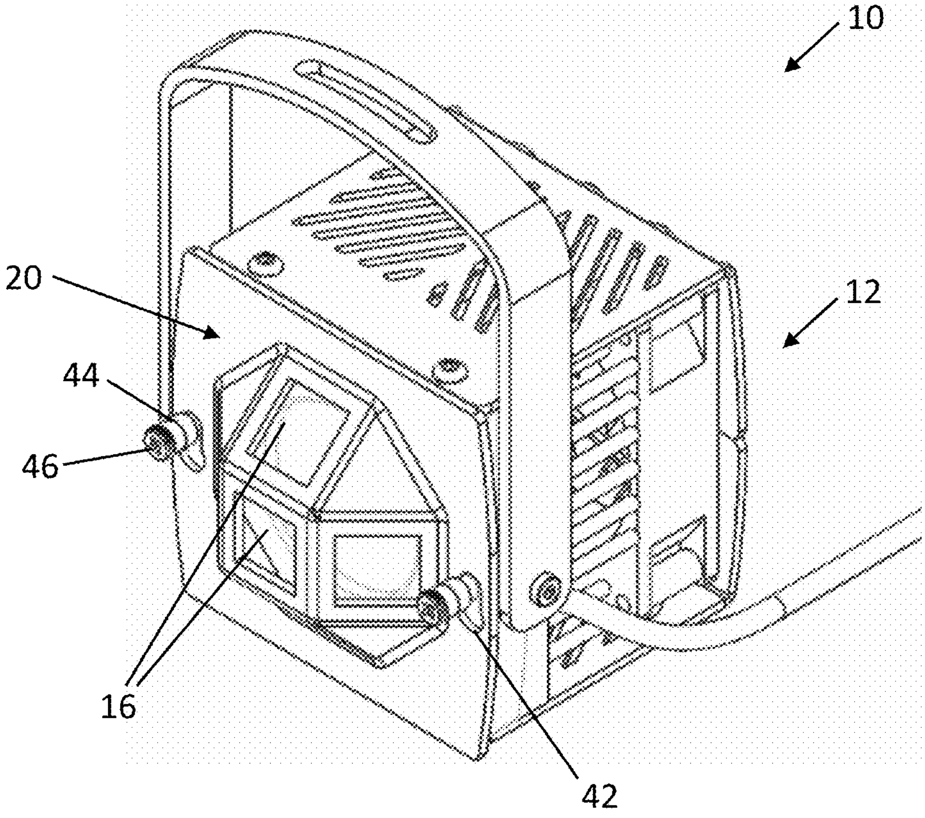
FIG. 3 is a front perspective view of the gobo apparatus of FIG. 1 with the addition of an interchangeable head, the head includes multiple gobos for projecting respective patterns.
Figure 4:
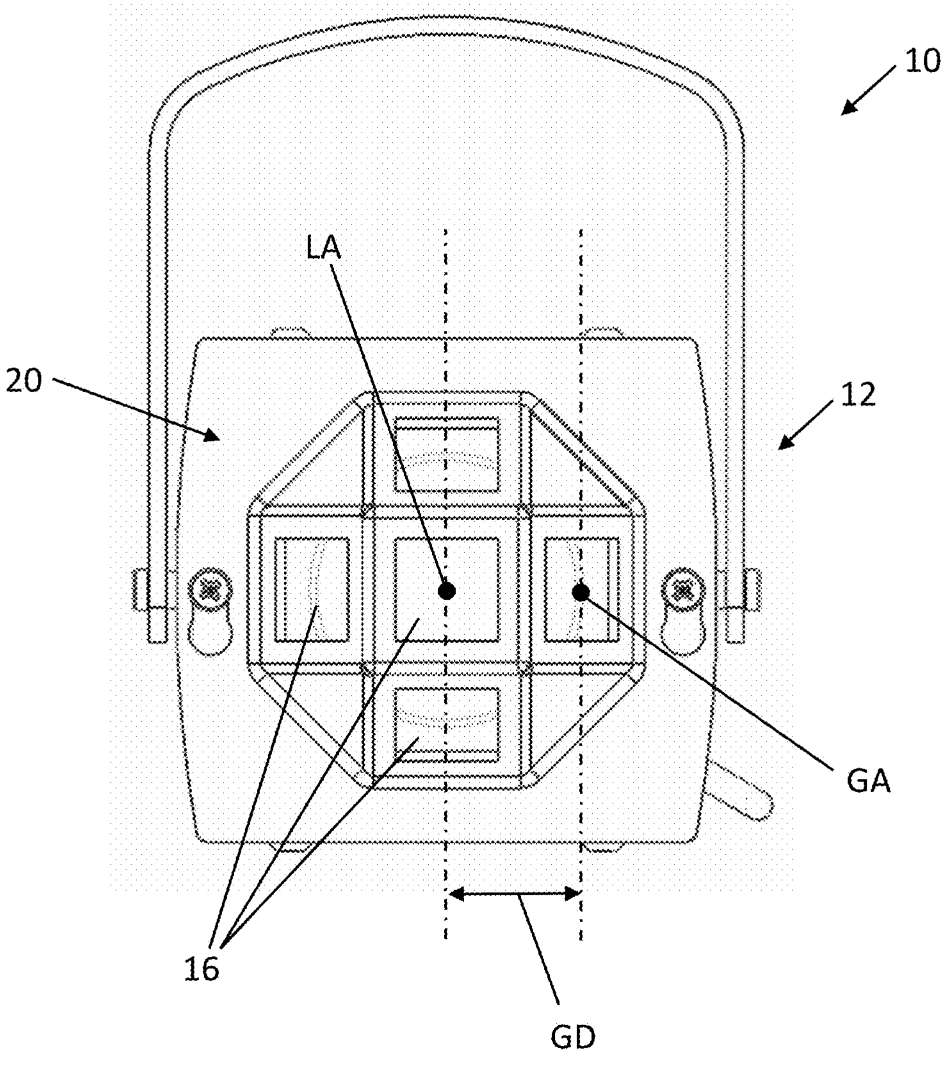
FIG. 4 is a front view of the gobo apparatus of FIG. 3.

The housing 12 may also include mounting features 38 for dually mounting the interchangeable optical device 18 and head 20 onto the housing 12. The mounting features 38 can be rigidly or removably connected to the internal frame 22 or the side walls 30 of the housing 12. The mounting features 38 can extend forwardly beyond the side walls 30 of the housing 12. The mounting features 38 may extend through corresponding mounting features 40 in the optical device 18 (FIG. 1) and corresponding mounting features 42 in the head 20 (FIG. 3).

Figure 5:
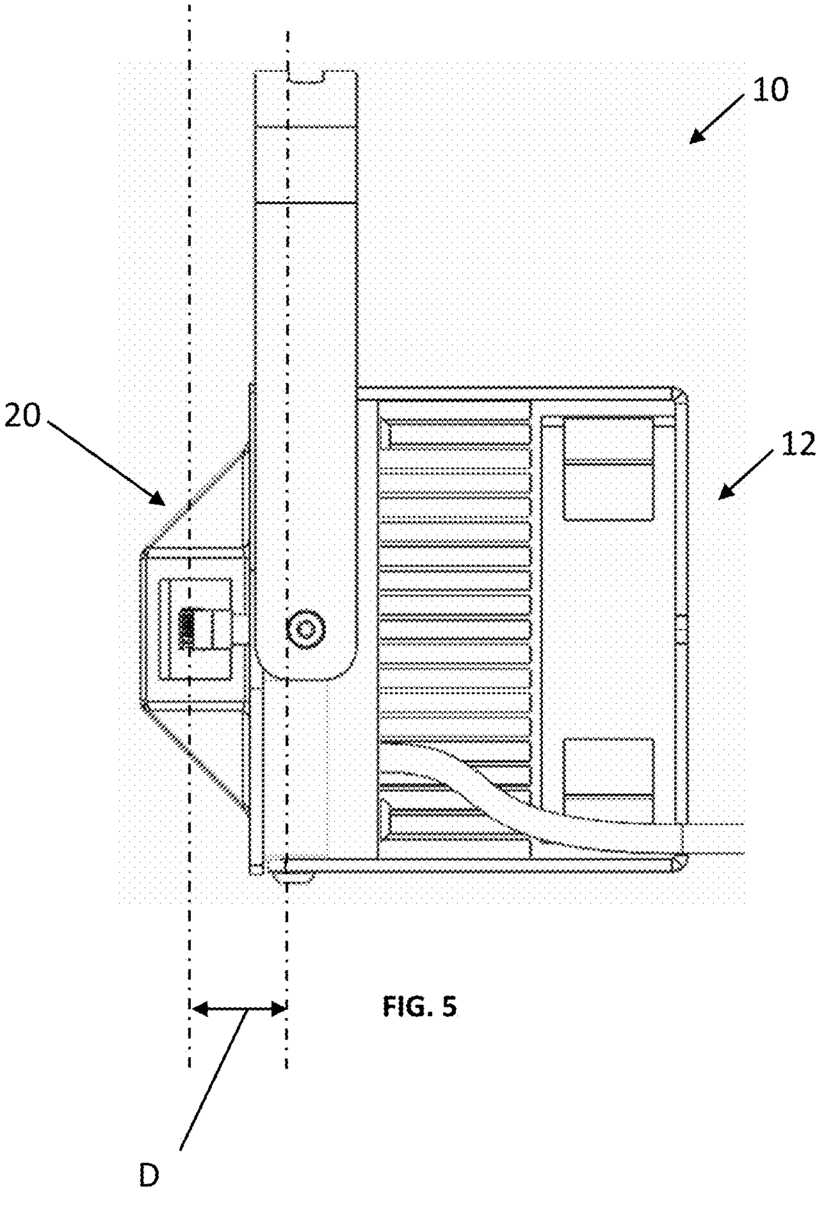
FIG. 5 is a left side view of the gobo apparatus of FIGS. 3-4.

The mounting features 38 can be in the form of protrusions, hollow stems 44, and/or fasteners 46. The protrusions can be in the form of rigid posts extending outwardly from the internal frame 22. The fasteners 46 can be in the form of pegs or screws that connect to corresponding receiving holes in the internal frame 22. Additionally, each fastener 46 can extend through a hollow stem or sleeve 44 that directly contacts each respective mounting feature 40, 42 of the optical device 18 and the head 20. Each stem 44 can be two-tiered having a first annular portion and a second annular portion with a diameter that is less than the diameter of the first portion (FIG. 5). The first and second annular portions of the stem 44 can correspond in size and shape of the mounting features 40, 42 of the optical device 18 and the head 20.

The light source 14 is configured to emit collimated light. The light source 14 can be mounted on a designated mount or head which in turn is connected to the internal frame 22 (FIG. 1). The light source 14 defines a light source axis LA which extends axially from a center point of the light source 14 (FIG. 1). The light source axis LA can be coaxial with a centerline of the housing 12. The light source 14 also defines a light source plane LP, which is the plane in which the light source 14 resides. The light source plane LP can be parallel to the rear wall 24 of the housing 12.

The light source 14 can be in the form of a laser-based light-emitting diode (LED). Alternatively, the light source 14 can be configured as a laser, an incandescent light, or a radiation source such as an IR or UV light source for emitting non-visible light. The light source may or may not include a designated collimator for collimating the light emanating from the light.

The optical device 18 is removably connected to the housing by the mounting features 38 of the housing 12. The optical device 18 is located in between the housing 12 and the head 20 (FIG. 3). The optical device 18 includes a body 48 and a transparent barrier 50 connected to the body 48 (FIG. 1). More particularly, the body 48 defines a planar wall with a cutout and the transparent barrier 50 is disposed within the cutout of the body 48. The transparent barrier 50 may in some embodiments be a simple glass plate with no lensing properties. The transparent barrier 50 may in alternative embodiments function as a lens to direct the light emanating from the light source 14. For example, in an embodiment wherein the transparent barrier 50 functions as a lens, the lens may narrow the light from the light source 14 from approximately 120 degrees down to 60 degrees. The transparent barrier 50 may be substantially parallel to the light source plane LP. The transparent barrier 50 may be alternatively configured as a reflector.

The mounting features 40 of the optical device 18 are located next to the sides of the body 48. The mounting features 40 are in the form of through holes for receiving the mounting features 38 of the housing 12 therethrough. The through holes 40 of the body 48 may or may not be threaded. As assembled, the body 48 of the optical device 18 can be seated within the open front end 32 of the housing 12 such that the top, bottom, and side walls 26, 28, 30 extend at least partially over the body 48.

The head 20 is removably connected to the housing 12 by the mounting features 42 of the housing 12 (FIG. 3). The head 20 is disposed in the open front end 32 of the housing 12. The head 20 includes multiple gobos 16 in a multiplane configuration. Each gobo 16 is configured to project a pattern onto a desired surface. The pattern projected by the gobo 16 will remain in focus, due to the collimated light, even if the entire assembly of the gobo apparatus 10 is moved relative to the surface upon which the pattern is projected and if the gobo 16 is moved axially, rotated, and/or tilted relative to the light source 14. The gobo 16 can be oriented non-perpendicularly to the light source plane LP and/or positioned off-center from the light source axis LA. Alternatively, the gobo 16 can be coaxial with the light source axis LA and oriented non-perpendicularly to the light source plane LP. The gobo 16 can be stationary or movable. For instance, the gobo 16 can be movable, such as rotatable, by the user or by one or more servo motors attached to the housing 12 and the gobo(s) 16 and/or head 20. Additionally, the gobo 16 can be planar, curved, and/or faceted and still project a focused pattern due to the collimated light.

Figure 6:
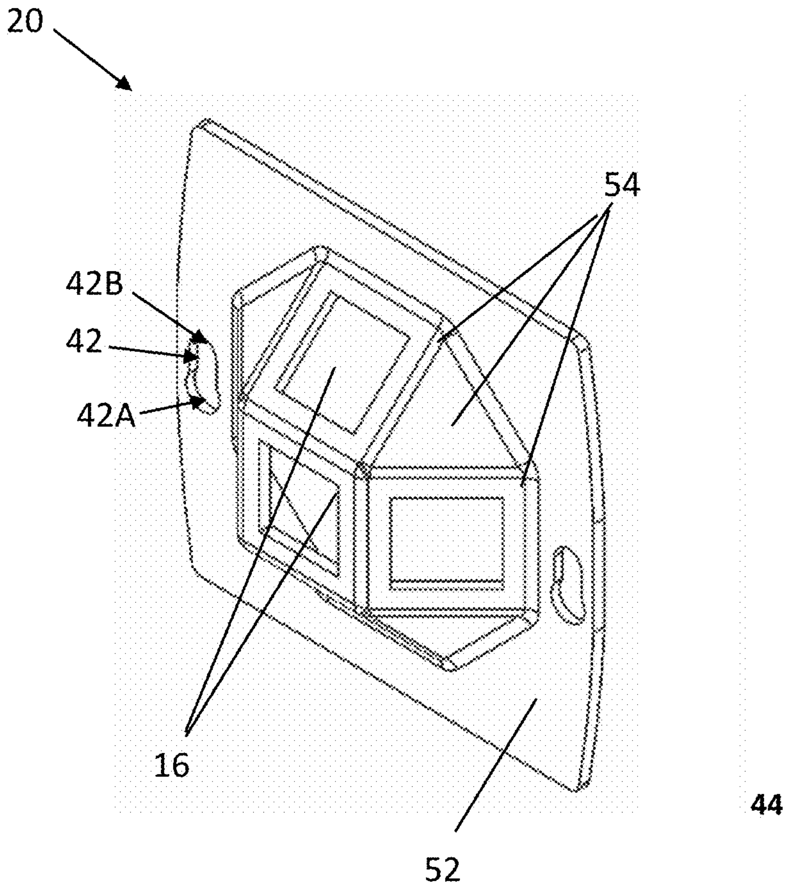
FIG. 6 is a front perspective view of the head of FIGS. 3-5 in isolation.

Generally, the head 20 includes a planar portion 52 removably connected to the housing 12 and at least one non-planar portion 54 extending from the planar portion 52 which mounts the at least one gobo 16 (FIG. 6). In other words, each gobo 16 is connected to a non-planar segment 54 of the head 20. As shown in FIGS. 1-6, the head 20 can include five gobos 16 respectively connected to five non-planar portions 54 and each having a differing angle relative to the light source plane LP. The planar portion 52 can be in the form of a wall that is perpendicular to the light source plane LP. As assembled, the back of the planar portion 52 can contact the optical device 18 and the top, bottom, and side 26, 28, 30 walls of the housing 12.

The non-planar portion(s) 54 of the head 20 are non-perpendicular to the light source plane LP, thus orienting the gobo(s) 16 thereon non-perpendicularly to the light source plane LP. The non-planar portions 54 of the head 20 can be monolithically formed with the planar portion 52 of the head 20. As shown in FIGS. 3-6, the non-planar protruding portions 52 can include nine non-planar wall segments 54 and five gobos 16 respectively disposed in the five differing wall segments 54. The outermost, center wall segment 54 can include a gobo 16 that is coaxial with the light source axis LA and perpendicular to the light source plane LP. The four surrounding wall segments 54 can each include a gobo 16 that is off-axis relative to the light source axis LA and non-perpendicular to the light source plane LP. Each gobo 16 on each surrounding wall segment 54 can be positioned such that its center point is located at a distance GD away from the light source axis LA. Four wall segments 54, in between the wall segments 54 with the gobos 16, may not include gobos 16 and may serve as structural wall segments.

The mounting features 42 of the head 20 are located next to the lateral sides of the planar portion. Each gobo 16 can be movably, e.g., rotatably and/or adjustably, connected to the housing 12 by way of the head 20. For example, the mounting features 38 of the housing 12 and the mounting features 42 of head 20 can allow the gobo 16 to be adjustably connected to the housing 12 without removing the gobo 16 from the housing 12. Adjusting the position of the head 20 will not diminish a focus of the pattern projected by the gobo(s) 16.

In one embodiment, each mounting feature 42 of the head 20 comprises a mounting slot 42 that corresponds to a respective mounting feature 38 of the housing 12. Each mounting slot 42 can have a key-hole design which a first, annular portion 42A and a second, channel portion 42B (FIG. 6). The first portion 42A has a width that is wider than the width of the second portion 42B. The second portion 42B of each mounting slot 42 is configured to contact a respective mounting feature 38 of the housing 12 and allow the head 20 to slide relative to the housing 12, thus allowing the position of the gobo(s) 16 to slide up or down relative to the light source axis LA. Thereby, when assembled, the first portion 42A of the slot 42 can be fitted around the first annular portion of the stem 44 and fastener 46, and thereafter the second portion 42B of slot 42 can be slid onto the second annular portion of the stem 44. As each fastener 46 is tightened, the lip (unnumbered) in between the first and second annular portions of the stem 44 can abut against the front of the planar portion 52 of the head 20 and secure head 20 onto the housing 12. To adjust a position of the head 20, the user can loosen the fasteners 46 and slide the head 20 up or down as it remains connected to the housing 12 and thereafter retighten the fasteners 46 to resecure the head 20 onto the housing 12. As can be appreciated, moving the gobo(s) 16 relative to the housing 12 will not alter the focused pattern projected by the gobo(s) 16.

Referring now collectively to FIGS. 1-10, there is shown various exemplary embodiments of possible interchangeable heads 20, 720, 920 with differing configurations of gobos 16. Each head 20, 720, 920 can be easily (dis) connected to the housing 12 for easily and efficiently interchanging various gobos 16 to achieve a desired pattern that is automatically in focus.

Figure 7:
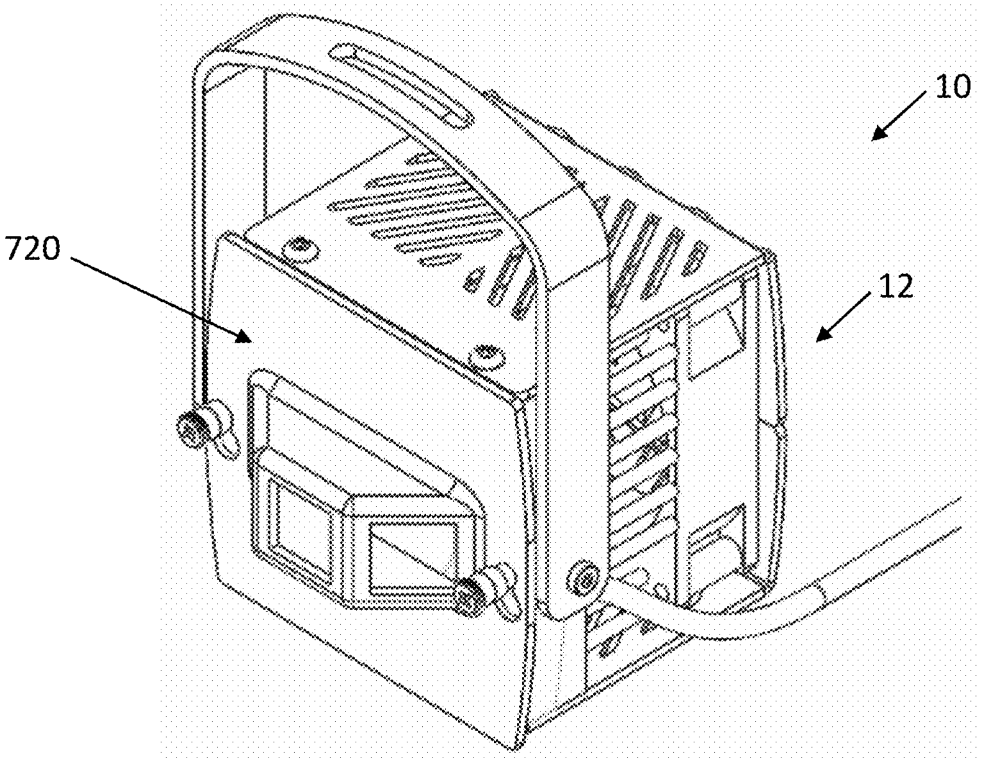
FIG. 7 is a front perspective view of another embodiment of a gobo apparatus which has a housing, a collimated light source, and head with multiple gobos.
Figure 8:
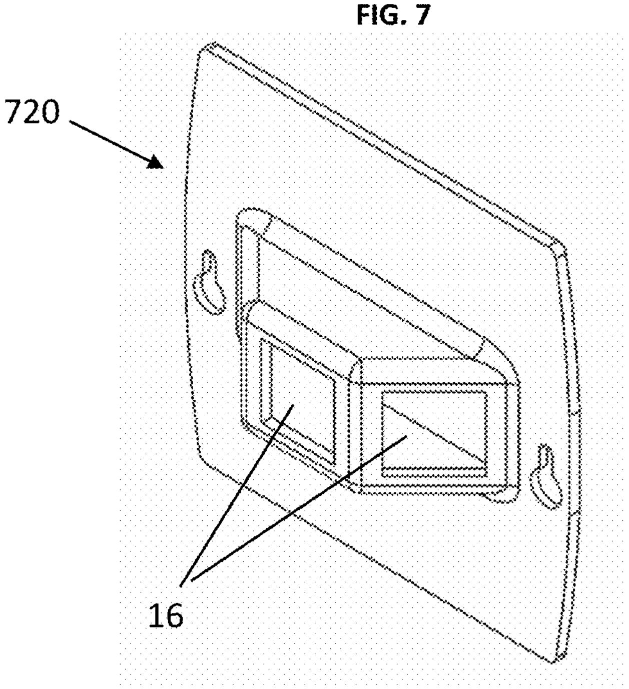
FIG. 8 is a front perspective view of the head of FIG. 7 in isolation.

Referring specifically to FIGS. 7-8, the interchangeable head 720 can include three gobos 16 disposed in three respective and differing planes relative to the light source plane LP. Each gobo 16 is connected to the head 720 and configured to project a respective pattern. The center gobo 16 is coaxial to the light source axis LA and perpendicular to the light source plane LP. The two opposing gobos 16 are each located off-axis to the light source axis LA and non-perpendicular to the light source plane LP.

Figure 9:
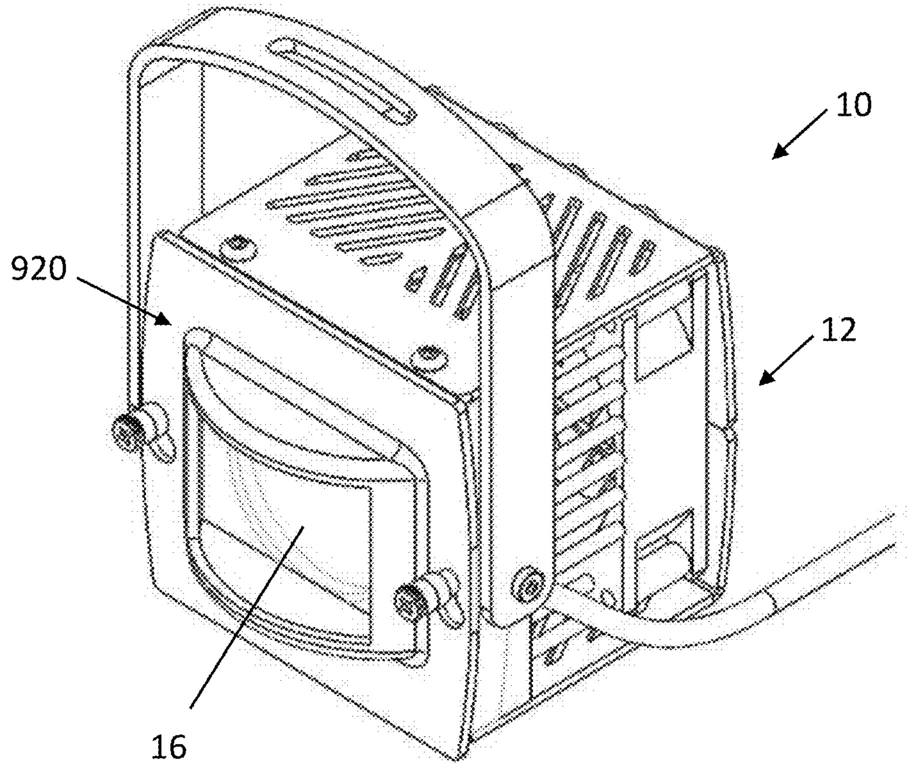
FIG. 9 is a front perspective view of another embodiment of a gobo apparatus which has a housing, a collimated light source, and a head with a curved gobo.
Figure 10:
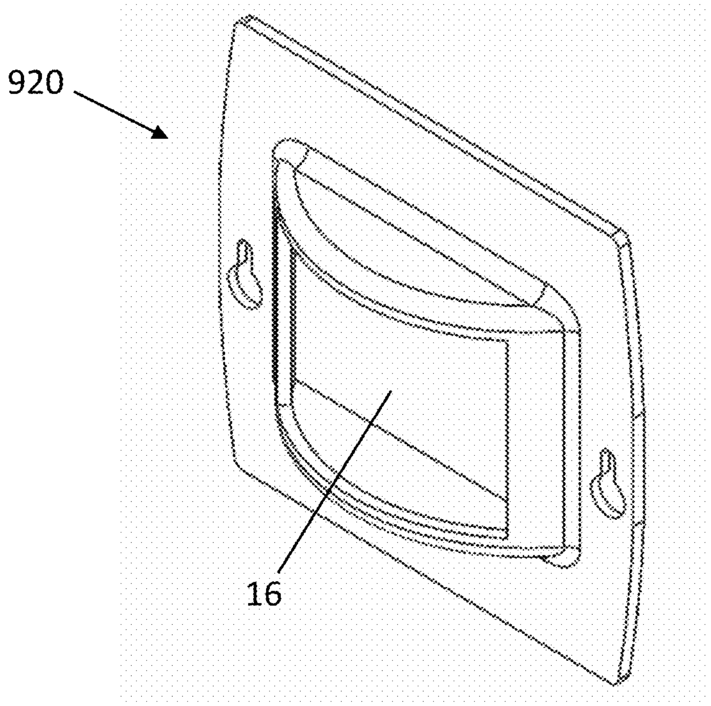
FIG. 10 is a front perspective view of the head of FIG. 9 in isolation.

Referring specifically to FIGS. 9-10, the interchangeable head 920 can include a single curved gobo 16 disposed in a curved, non-planar portion that protrudes outwardly from the planar portion of the head 920. The curved gobo 16 is configured to project the focused pattern, irrespective of its curvature. The center point of the single curved gobo 16 can be coaxial to the light source axis LA.

In use, the user can initially mount the gobo apparatus 10 onto a desired wall or structure. More particularly, the user may attach the handle 34 of the housing 12 onto the wall or other structure. For instance, the gobo(s) 16 may be used to project the focused pattern, e.g. lettering, onto a floor or pathway. Hence, the off-axis or curved gobo(s) 16 can suitably distort the pattern such that when the pattern is projected onto the floor or pathway the pattern is not distorted or out of focus.

After installation of the gobo apparatus 10, the user may direct the gobo apparatus 10 such that the light source plane LP is oriented non-perpendicularly to the surface on which the focused pattern is projected onto by the gobo(s) 16. The user may attach a desired interchangeable head 20, 720, 920 onto the housing 12. Thereafter, to interchange the pattern, the user may remove the first interchangeable head from the housing 12 and subsequently connect a second interchangeable head onto the housing 12. Due to the collimated light source, the pattern of the first and second interchangeable heads will automatically remain in focus.

While illustrative arrangements of the invention have been described with respect to at least one embodiment, the arrangements and methods can be further modified within the spirit and scope of this disclosure, as demonstrated previously. This application is therefore intended to cover any variations, uses, or adaptations of the arrangement and method using its general principles. Further, this application is intended to cover such departures from the present disclosure as come within known or customary practice in the art to which the disclosure pertains and which fall within the limits of the appended claims.

What is claimed is:

1. A gobo apparatus, comprising:
a housing;
a collimated light source disposed within the housing and configured to emit collimated light, the collimated light source defining a light source axis and a light source plane;
at least one gobo connected to the housing, the at least one gobo is oriented non-perpendicularly to the light source axis; and
a head removably connected to the housing; wherein
the at least one gobo is connected to the head; and
the head comprises:
a planar portion removably connected to the housing, the planar portion is perpendicular to the light source axis; and
at least one non-planar portion extending from the planar portion,
wherein the at least one gobo is connected to the non-planar portion of the head.

2. The gobo apparatus of claim 1, wherein:
the at least one gobo comprises a plurality of gobos, each gobo having a differing angle relative to the light source axis; and
at least one of the plurality of gobos is oriented non-perpendicularly to the light source plane.

3. The gobo apparatus of claim 2, wherein:
a first gobo of the plurality of gobos is perpendicular to the light source axis and coaxial to the light source axis;
a second gobo of the plurality of gobos is non-perpendicular to the light source axis and off-center from the light source axis; and
a third gobo of the plurality of gobos is non-perpendicular to the light source axis and off-center from the light source axis.

4. A gobo apparatus, comprising:
a housing;
a collimated light source disposed within the housing and configured to emit collimated light, the collimated light source defining a light source axis and a light source plane;
at least one gobo connected to the housing, the at least one gobo is oriented non-perpendicularly to the light source axis; and
a head removably connected to the housing; wherein
the at least one gobo is connected to the head;
an optical device is removably connected to the housing and located in between the collimated light source and the head; and
the optical device comprises a body and a transparent barrier disposed within the body, and the transparent barrier is perpendicular to the light source axis.

5. The gobo apparatus of claim 4, wherein:
the at least one gobo is configured to project a focused pattern when the collimated light passes therethrough irrespective of an axial distance between the collimated light source and the at least one gobo, a position of the at least one gobo relative to the light source axis, and an orientation of the at least one gobo relative to the light source plane.

6. The gobo apparatus of claim 4, wherein:
the at least one gobo is positioned off-center from the light source axis.

7. The gobo apparatus of claim 4, wherein:
the at least one gobo comprises a curved gobo.

8. The gobo apparatus of claim 4, wherein:
the at least one gobo is coaxial with the light source axis.

9. The gobo apparatus of claim 4, wherein:
the housing comprises mounting features which dually mount the optical device and the head.

10. The gobo apparatus of claim 9, wherein:
the head comprises corresponding mounting features that correspond to the mounting features of the housing; and
the mounting features of the head are configured to allow the head, and the at least one gobo therewith, to be movably connected to the housing without removing the head from the housing.

11. The gobo apparatus of claim 10, wherein:
the mounting features of the head comprise a pair of mounting slots; and
the mounting features of the housing comprise a pair of fasteners respectively extending through the mounting slots and removably securing the head onto the housing.

12. The gobo apparatus of claim 11, wherein:
each mounting slot comprises a first portion and a second portion, the first portion being wider than the second portion; and
the second portion of each mounting slot configured to allow the head to slide relative to the housing.

13. The gobo apparatus of claim 4, wherein:
the housing comprises a back wall and an open front end opposite the back wall, wherein the head is disposed in the open front end of the housing.

14. The gobo apparatus of claim 2, wherein:
the at least one gobo is movably mounted to the housing; and
the at least one gobo is configured to be movable relative to the housing without diminishing a focus of the focused pattern.

15. The gobo apparatus of claim 2, wherein:
the at least one gobo is adjustably mounted to the housing; and
the at least one gobo is configured to be adjustable relative to the housing without diminishing a focus of the focused pattern.

16. The gobo apparatus of claim 5, wherein:
the housing is configured to be mounted on a wall or a structure such that the light source plane is oriented non-perpendicularly to a surface on which the focused pattern is projected onto by the gobo and the focused pattern remains in focus due to the collimated light emanating from the collimated light source.

17. A gobo apparatus comprising:
a housing having mounting features;

a collimated light source disposed within the housing and configured to emit collimated light, the collimated light source defining a light source axis and a light source plane;

an optical device removably connected to the housing by the mounting features; and a first head and a second head, each head comprising at least one gobo that is oriented non-perpendicularly to the light source axis, the at least one gobo is configured to project a focused pattern when the collimated light passes therethrough, and each head being configured to be removably connected to the housing by the mounting features such that the first and second heads are interchangeable with one another.

18. A method comprising:

providing a gobo apparatus comprising a housing, a collimated light source disposed within the housing and configured to emit collimated light, the collimated light source defining a light source axis and a light source plane, a first head and a second head, each head comprising at least one gobo that is oriented non-perpendicularly to the light source axis, the at least one gobo is configured to project a focused pattern when the collimated light passes therethrough, and each head being configured to be removably connected to the housing by the mounting features such that the first and second heads are interchangeable with one another;

connecting the first head onto the housing;

removing the first head from the housing; and connecting the second head onto the housing, wherein the focused pattern of the at least one gobo of the second head is automatically in focus.

* * * * *